Feb. 19, 1952                    J. F. STALTER                    2,586,445
                              PACKAGING MACHINE
Filed June 2, 1947                                              3 Sheets-Sheet 1
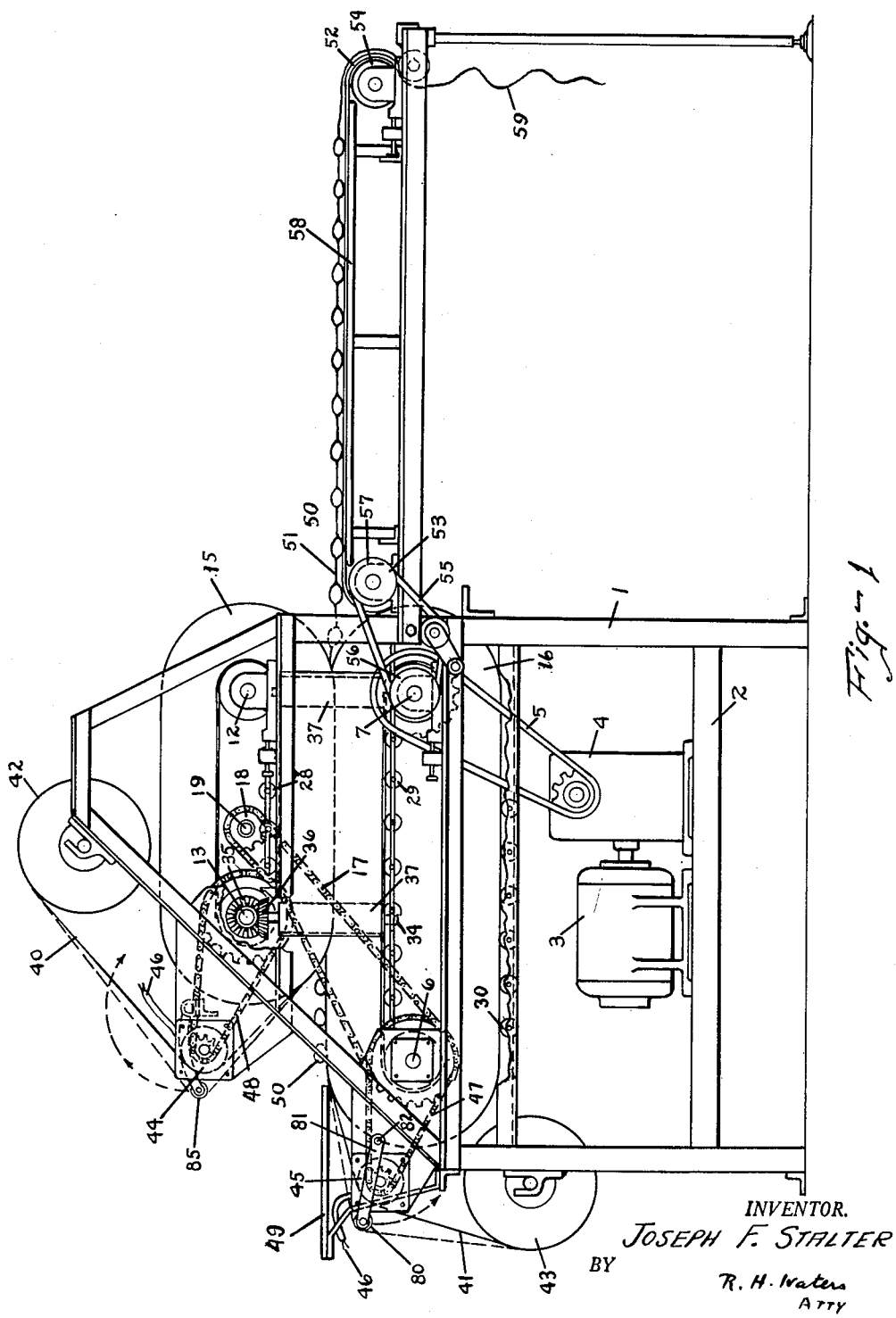
INVENTOR.
JOSEPH F. STALTER
BY
R. H. Waters
ATTY Feb. 19, 1952  J. F. STALTER  2,586,445
PACKAGING MACHINE
Filed June 2, 1947  3 Sheets-Sheet 2

Inventor
JOSEPH F. STALTER
R. H. Waters
Attorney

Feb. 19, 1952 J. F. STALTER 2,586,445
PACKAGING MACHINE
Filed June 2, 1947 3 Sheets-Sheet 3

INVENTOR.
JOSEPH F. STALTER
BY R. H. Waters
ATTY

Patented Feb. 19, 1952

2,586,445

UNITED STATES PATENT OFFICE 2,586,445

PACKAGING MACHINE

Joseph F. Stalter, Akron, Ohio, assignor to Wingfoot Corporation, Akron, Ohio, a corporation of Delaware Application June 2, 1947, Serial No. 751,699

4 Claims. (Cl. 18—19)

This invention relates to an improved packaging machine of the type in which two thermosealable films of wrapping material are heated and then resiliently pressed together around a series of objects to be wrapped, thereby sealing the objects between the films. The objects may be automatically fed to the machine. The wrapped articles are delivered from the machine enclosed between the two films. The individual articles or a number of the articles sealed between the films may be cut from the united films as they leave the machine, and such cutting may be by automatic machinery.

The resilient means for pressing the film around the articles to be wrapped is formed preferably of two sponge rubber belts which are preferably moved at the same speed. Novel means is provided for compressing these belts as they press the films against the objects to be wrapped. The wrapping film is preferably rubber hydrochloride film, but other heat-sealable film may be used. The invention includes means for separating the film from the heating means while the machine is not in use. The details of the construction and operation of the wrapping machine and novel features which are claimed as a part of this invention will be described in connection with the accompanying drawings. In the drawings:

Fig. 1 is a side elevation of the machine;

Figures 2, 3:
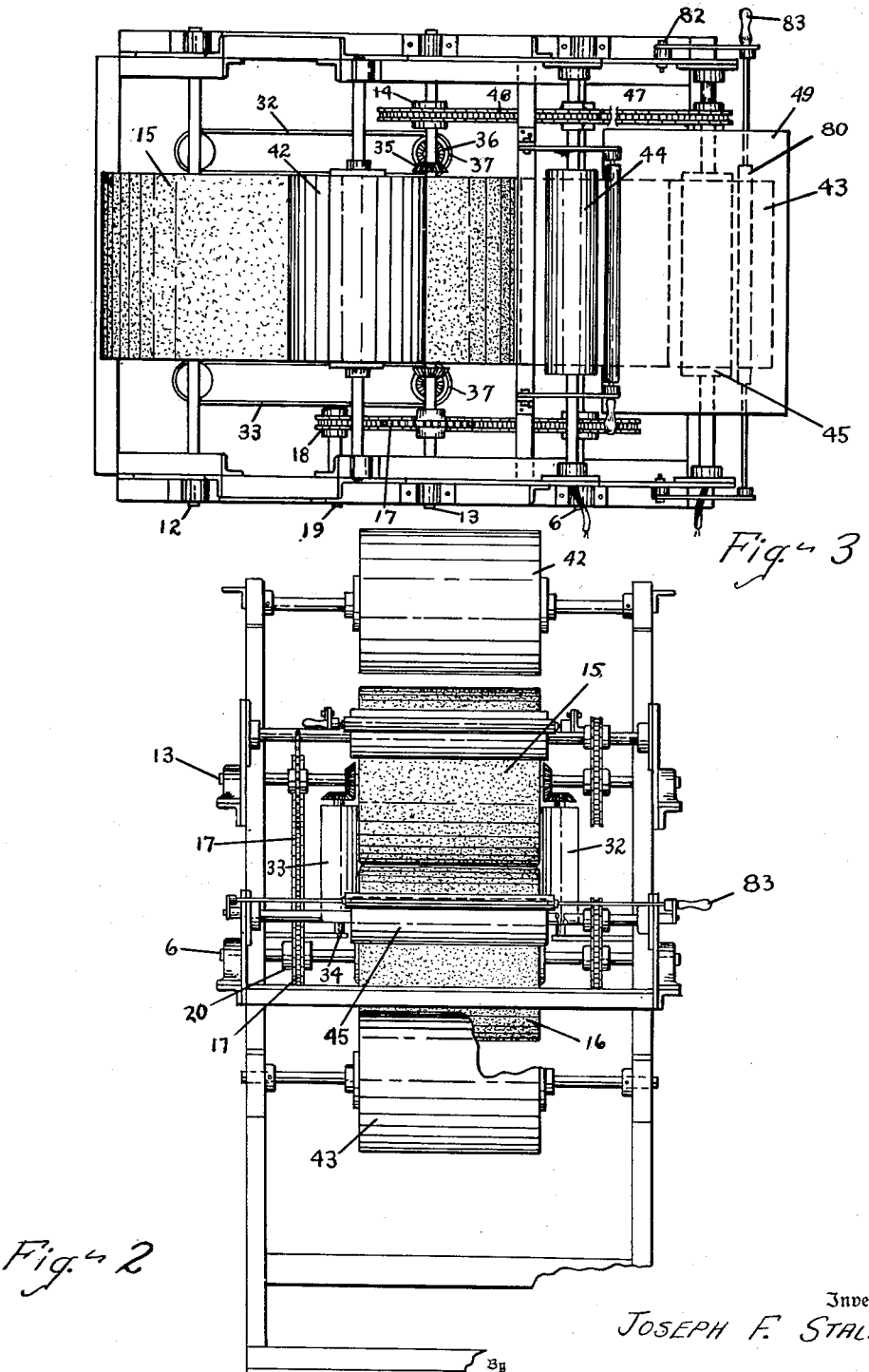
Fig. 2 is a front elevation omitting the motor.
Fig. 3 is a plan view omitting the delivery belt at the rear of the machine.

The framework 1 of the machine supports a platform 2 on which the motor 3 is mounted. This motor operates the wrapping machine through the gear-reduction mechanism 4 and the chain or belt 5 which drives the machine.

Drums 8 are mounted on the lower shafts 6 and 7 and on the upper shafts 12 and 13, and the sponge rubber belts 15 and 16 are supported on these drums. Thus the belt 16 turns the shaft 6 and the belt 15 turns the shaft 12. The shaft 13 is driven from the shaft 6 by means of a chain 17 which is trained over an idler sprocket 18 on a shaft 19 and the sprocket 20 secured to the shaft 6.

Figures 4, 5:
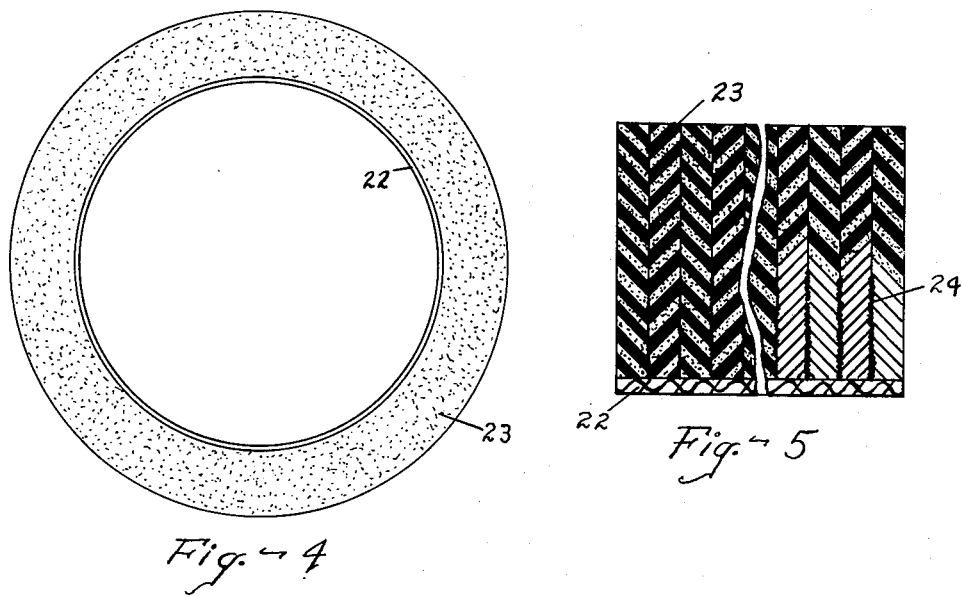
Figs. 4 and 5 are details illustrating the construction of the sponge rubber belt.
Figure 6:
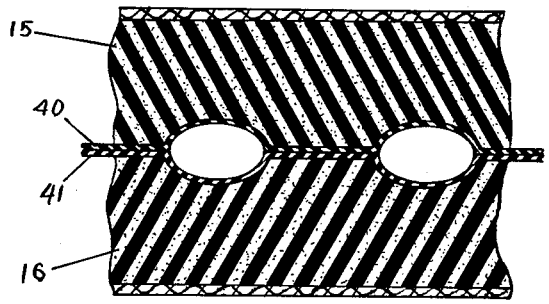
Fig. 6 shows objects being enclosed in the rubber hydrochloride film between the sponge rubber belts.

The articles to be wrapped are covered by film which is pressed to the articles from above and below by the two thick sponge rubber belts 15 and 16. Each of these sponge rubber belts is supported on an ordinary belt 22, as shown in Fig. 4. This belt may be of leather but is preferably of rubberized fabric preformed to a substantially circular shape of the required dimensions. A plurality of annular sponge rubber pieces 23 in the form of flat disks are either preformed to the desired shape or cut to the desired shape from a sheet of sponge rubber and placed so as to encircle each of the belts as illustrated in Fig. 4. The several annular pieces are plied up so as to form a series of layers of sponge rubber arranged perpendicularly and lying laterally of one another as illustrated in Fig. 5.

These pieces of sponge rubber are bonded together over the inner portion of their lateral surfaces as illustrated by the reference character 24 in Fig. 5. Any suitable rubber cement may be used for this purpose. This makes a unitary structure of the inner portion of each of the belts while leaving the outer portions a series of layers free to move against one another, except for the frictional contact between them. Thus, the adjacent layers may yield to pressure more or less independently of one another as articles to be wrapped are placed between them. These details of construction are illustrative only; the belt may be formed in any desired manner. Thus, the upper and lower sponge rubber belts 15 and 16 are constructed in any suitable fashion. The plies of sponge rubber are united to the supporting belt 22 by a suitable adhesive. A friction clutch may be provided in the driving mechanism of the upper belt so that the belts may move at different speeds and accommodate themselves to the various frictional driving forces which are put in motion when articles are being wrapped. However, when belts which pass over vertical axes are used for compressing the sponge rubber, as described below, both sponge rubber belts are preferably driven at the same speed.

Any suitable means for insuring that the desired pressure is maintained between the belts may be supplied. Thus, the rollers 28 and 29 may be provided to prevent the upper belt from rising and the lower belt from being depressed as articles are passed between them. Similar rollers 30 may advantageously be used to support the lower stretch of the lower belt.

In order to apply pressure, the sponge rubber belts must be maintained in a more or less compact condition. The belts 32 and 33 are provided for this purpose. They are supported over drums 37 flanged at the bottom which are fastened to the vertical shafts 34, and on each side of the machine the shaft 34 which is nearer the front is driven by a beveled gear 35 mounted on the shaft 13 which meshes with a beveled gear 36 fastened to the upper end of the shaft 34. The flange at the bottom of each of the drums 37 prevents the respective belts from slipping off the drums. The belts 32 and 33 may be of canvas or may be rubber-covered or leather or may even be of metal. The belts prevent the sponge rubber from spreading as pressure is applied to the articles passed through the belts. Thus, the sponge is compressed, and the pressure between the belts is made sufficient to unite the heated thermosealable films as they are passed between the belts.

Rubber hydrochloride film is a preferred film for use on such wrapping mechanism. It is thermosealable and it maintains this property for a considerable period after heating so that even though the film may be cooled to room temperature, two plies which have been heated may be united by simply pressing them together if the pressure is applied within a reasonably short period after the films are heated.

Each of the two plies of rubber hydrochloride film 40 and 41 removed from the stock rolls 42 and 43 respectively, is heated by being passed over the respective heated roller or drum 44 or 45. Electrical contacts 46 are shown for supplying current to heat these drums. The roller 44 is driven by the chain 47 and the roller 45 is driven by the chain 48. It is necessary to drive these rollers because otherwise the heated film would be stretched an uncontrollable amount as it was pulled into the bite between the sponge rubber belts. By controlling the speed of rotation of the rollers 44 and 45 stretching may be prevented or controlled. If the film on the stock rolls 42 and 43 is stretched, the speed of the drums 44 and 45 may permit the heated films to shrink. In passing over the heated rolls, the film is heated sufficiently so that when later pressed together between the sponge rubber belts, the contacting surfaces will be either welded together or will be only lightly sealed together. If the films are hot and they are permanently welded together, the resulting package can not be opened without destroying the film. If the films are heated to a lower temperature so that they are adhered to one another without welding they may be stripped from one another without tearing, in opening a package. Thus, the form of union effected between the films may be varied depending upon the temperature to which the films are heated. The pressure applied by the sponge rubber belts also determines the nature of the union to some extent.

The upper and lower wrapping films 40 and 41, after they have been heated, are fed into the bite of the sponge rubber belts 15 and 16. The objects 50 which are to be wrapped are placed between the films just as they enter into the bite. The platform 49 is provided to facilitate feeding the objects. The resilient belts press the films over the upper and lower surfaces of the objects and unite the films between the objects. Thus, the objects are individually enclosed between the two plies of film, and the films are sealed together in the areas between the objects. The objects are thus delivered from the delivery end of the machine as a sheet 51 which contains the objects 50 enclosed between the two plies of film.

The sheet 51 which includes the objects enclosed between the two plies of film is received on the conveyor belt 52 which is supported by the rollers 53 and 54. The roller 53 is driven by the belt 55 from the sheave 56 on the shaft 7 and the sheave 57 on the shaft which supports the roller 53. The upper stretch of this conveyor belt 52 is supported from below by the table or other supporting means 58.

The individual objects are cut from the sheet 51 and the scrap 59 is disposed of in any suitable manner. If preferred, a number of objects, such as a half dozen of the objects if they be oranges or other fruit or the like, may be cut out together. They may be packaged as desired. Automatic means may be provided for feeding the objects in a predetermined pattern, and this may be coordinated with cutting means for automatically cutting the packaged objects from the sheet 51. For instance, the objects may be aligned laterally across the belt and the sheet 51 may be cut laterally from side to side to deliver a number of the objects packaged side by side between two narrow strips of the film. Die cutters may be used for separating individual objects from the sheet 51.

If the film is allowed to rest on the heated rollers for any prolonged period of time, it will soften and may stick to the rollers. It is, therefore, desirable to lift the film from the heated rollers whenever the machine is not operating. The roller 80 mounted between the arms 81 pivoted at 82 is provided with a handle 83 so that it may readily be swung up as shown in Fig. 1 to lift the film from the roller 45. The dotted line and arrow indicate that when the machine is operating, the roller 80 is lowered so that the film rests on the roller 45. Any suitable means for holding the supporting shaft 81 in the raised position may be provided. The roller 85, of similar construction and mounting, serves to lift the heated film from the upper roller 44 when the machine is not operating, and the dotted line and arrow indicate the position in which the roller 85 is moved when the machine is operating.

The mechanism shown and described is illustrative and equivalent means may be employed without departing from the scope of the invention.

What I claim is:

1. In a wrapping machine, means for holding two supply rolls of film on parallel axes, two sponge rubber belts of equal width with rotatable means within opposite ends of each for supporting them, the axes of all the rotatable means being parallel to the aforesaid axes, lateral stretches of the sponge rubber belts being in pressure contact with one another, on each side of the belts a belt on axes perpendicular to the aforesaid axes and in pressure contact with its side of the sponge rubber belts to prevent growth thereof when objects are located between the contacting sponge rubber surfaces, drums with means for heating the same with axes parallel to the first mentioned axes and located so that film from the respective supply rolls may pass over the same en route to passing between the sponge rubber belts, roller means adapted to be interposed between the respective films and heating drums so that each film may be separated from its respective heating drum when the machine is not in operation, and means for rotating at least one of the rotatable means which support the sponge rubber belts and means for rotating each of the heating drums from the supporting means for the belt to which film is fed from it.

2. In a wrapping machine, two continuous sponge rubber belts of the same width mounted on parallel axes with a parallel stretch of one in pressure contact with a parallel stretch of the other so as to exert resilient pressure on objects and wrapping material placed between them and on each side of the sponge rubber belts and on axes perpendicular to said axes a belt adapted to move in pressure contact with the sides of said sponge rubber belts to prevent the growth thereof as pressure is applied thereto.

3. In a wrapping machine, the combination with means for feeding layers of wrapping material along a given path, movable belts mounted adjacent said path and adapted to press the wrapping material about an object, at least one of said belts having the operative surface thereof formed of highly yieldable material, and movable belts mounted adjacent said first belts at the lateral edges thereof and having the active runs thereof closely adjacent the edges of said highly yieldable material at the wrapping position to prevent lateral bulging thereof.

4. A wrapping machine in which there is means for feeding wrapping material to a wrapping position and means for pressing the wrapping material about an article, in which the pressing means includes a movable endless belt formed with at least its operative pressing surface of highly compressible material adapted to readily conform to the shape of an object being wrapped, means for driving said belt and moving belts arranged at the opposite lateral sides of the first belt with one run of each of the latter belts arranged adjacent a lateral edge of said highly compressible material of said first belt adjacent the wrapping position to give lateral support thereto and thus prevent lateral bulging thereof.

JOSEPH F. STALTER.

REFERENCES CITED

The following references are of record in the file of this patent:

UNITED STATES PATENTS

| Number | Name | Date |
|---|---|---|
| 1,540,650 | Prather | June 2, 1925 |
| 1,751,430 | Thomson | Mar. 18, 1930 |
| 2,035,552 | Knowlton | Mar. 31, 1936 |
| 2,082,721 | Sanford | June 1, 1937 |
| 2,403,482 | Cloud | July 9, 1946 |
| 2,438,089 | Carson | Mar. 16, 1948 |
| 2,441,235 | Blair et al. | May 11, 1948 |